(12) United States Patent
Usami

(10) Patent No.: US 10,914,947 B2
(45) Date of Patent: *Feb. 9, 2021

(54) HEAD MOUNTED DISPLAY AND INFORMATION PROCESSING METHOD

(71) Applicant: Sony Interactive Entertainment Inc., Tokyo (JP)

(72) Inventor: Morio Usami, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 109 days.

This patent is subject to a terminal disclaimer.

(21) Appl. No.: 16/218,722

(22) Filed: Dec. 13, 2018

(65) Prior Publication Data

US 2019/0113749 A1 Apr. 18, 2019

Related U.S. Application Data

(63) Continuation of application No. 15/501,372, filed as application No. PCT/JP2015/080383 on Oct. 28, 2015, now Pat. No. 10,185,146.

(30) Foreign Application Priority Data

Nov. 4, 2014 (JP) .................................. 2014-224154

(51) Int. Cl.
*G02B 27/14* (2006.01)
*G09G 5/00* (2006.01)
(Continued)

(52) U.S. Cl.
CPC ....... *G02B 27/0101* (2013.01); *G02B 27/017* (2013.01); *G06F 3/011* (2013.01);
(Continued)

(58) Field of Classification Search
CPC .... G02B 2027/0134; G02B 2027/0138; G02B 2027/014; G02B 2027/0141;
(Continued)

(56) References Cited

U.S. PATENT DOCUMENTS

| 10,185,146 B2* | 1/2019 | Usami ................. G09G 3/20 |
| 2013/0328928 A1 | 12/2013 | Yamagishi |
| 2015/0234044 A1 | 8/2015 | Ouchi |

FOREIGN PATENT DOCUMENTS

| JP | 2009104363 A | 5/2009 |
| JP | 2009137494 A | 6/2009 |

(Continued)

OTHER PUBLICATIONS

International Search Report for corresponding PCT Application No. PCT/JP2015/080383, 4 pages, dated Jan. 19, 2016.

(Continued)

*Primary Examiner* — William Choi
(74) *Attorney, Agent, or Firm* — Matthew B. Dernier, Esq.

(57) ABSTRACT

Methods and apparatus providing a head-mounted display to be worn by the user and presenting a video to the user through the head-mounted display; measuring outside world information via an outside world measurement section of the head mounted display; detecting, via a notification information detection section, whether or not the information measured by the outside world measurement section contains any notification information to be notified to the user, including that the notification information detection section detects at least one reference position, which is set by the user as notification information; and notifying the user, via a notification section, when the notification information detection section detects notification information by way of (Continued)

displaying a video of the at least one reference position to the user in the head-mounted display.

19 Claims, 3 Drawing Sheets

(51) Int. Cl.
| | |
|---|---|
| *G02B 27/01* | (2006.01) |
| *G09G 3/20* | (2006.01) |
| *G09G 5/377* | (2006.01) |
| *G06F 3/147* | (2006.01) |
| *G06F 3/01* | (2006.01) |
| *G09G 3/00* | (2006.01) |
| *G06F 3/0346* | (2013.01) |
| *G08B 21/02* | (2006.01) |
| *H04N 5/64* | (2006.01) |
| *H04N 13/239* | (2018.01) |

(52) U.S. Cl.
CPC ............ *G06F 3/0346* (2013.01); *G06F 3/147* (2013.01); *G08B 21/02* (2013.01); *G09G 3/002* (2013.01); *G09G 3/20* (2013.01); *G09G 5/00* (2013.01); *G09G 5/377* (2013.01); *G02B 2027/014* (2013.01); *G02B 2027/0138* (2013.01); *G02B 2027/0141* (2013.01); *G02B 2027/0167* (2013.01); *G02B 2027/0187* (2013.01); *G02B 2027/0192* (2013.01); *G09G 2370/16* (2013.01); *H04N 5/64* (2013.01); *H04N 13/239* (2018.05)

(58) Field of Classification Search
CPC ............ G02B 2027/0178; G02B 27/01; G02B 27/0101; G02B 27/017; G02B 27/0172
USPC .................................. 359/466, 630; 345/7–9
See application file for complete search history.

(56) References Cited

FOREIGN PATENT DOCUMENTS

| | | |
|---|---|---|
| JP | 2013164737 A | 8/2013 |
| JP | 2013257716 A | 12/2013 |
| WO | 2013052855 A2 | 4/2013 |
| WO | 2014033957 A1 | 3/2014 |

OTHER PUBLICATIONS

International Preliminary Report on Patentability and Written Opinion for corresponding PCT Application No. PCT/JP2015/080383, 12 pages, dated May 18, 2017.
Search Report for corresponding EP Application No. 15856535.8, 8 pages, dated Jun. 1, 2018.
Notification of Reason for Refusal for corresponding JP Application 2014224154, 7 pages, dated May 29, 2018.
Office Action for corresponding U.S. Appl. No. 15/501,372, 7 pages, dated May 31, 2018.

* cited by examiner

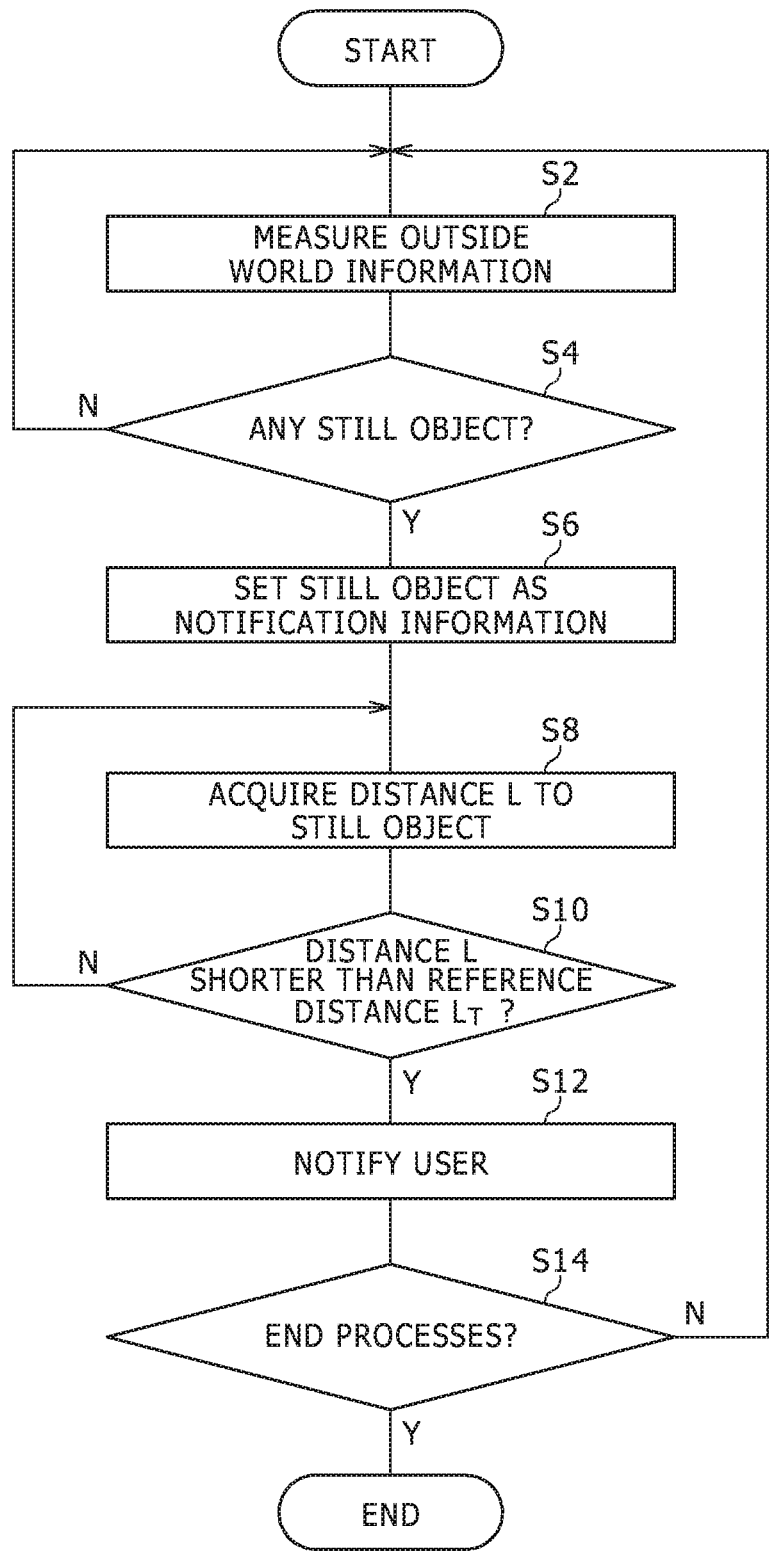

HEAD MOUNTED DISPLAY AND INFORMATION PROCESSING METHOD

CROSS REFERENCE TO RELATED APPLICATIONS

This application is a continuation of U.S. patent application Ser. No.: 15/501,372, accorded a filing date of Feb. 2, 2017 (allowed), which is a National Phase Application of PCT/JP2015/080383, filed Oct. 28, 2015, which is an international application claiming priority to JP 2014-224154, filed Nov. 4, 2014, the entire disclosures of which are hereby incorporated by reference.

TECHNICAL FIELD

The present invention relates to a head-mounted display and an information processing method carried out by the head-mounted display.

BACKGROUND ART

Recent years have seen advancement in technological developments for presenting stereoscopic videos, contributing to widespread use of head-mounted displays that permit presentation of stereoscopic videos with depth. Capable of presenting videos having depth to users, head-mounted displays are now used as presentation devices of three-dimensional (3D) content such as 3D movies and 3D games.

SUMMARY

[Technical Problem]

A head-mounted display is worn in such a manner as to cover both eyeballs of the user, an observer. Some head-mounted displays are non-see-through ones. Each of these head-mounted displays blocks out an outside world from a user's vision and presents a video when worn by the user. In general, when wearing such a non-see-through head-mounted display, the user has difficulty in viewing a real-world scene in the outside world.

For example, if a non-see-through head-mounted display is used where the user is allowed to move or play to a limited extent such as at home, it is convenient to present, to the user, the extent to which the user wearing the head-mounted display is allowed to move.

The present invention has been devised in light of the foregoing, and it is an object of the present invention to provide a technology for notifying an outside world condition to a user wearing a non-see-through head-mounted display.

[Solution to Problem]

In order to solve the above problem, a head-mounted display according to a mode of the present invention blocks out an outside world from a user's vision and presents a video when worn by the user. The head-mounted display includes an outside world measurement section, a notification information detection section, and a notification section. The outside world measurement section measures outside world information. The notification information detection section detects whether or not the information measured by the outside world measurement section contains any notification information to be notified to the user. The notification section notifies the user when the notification information detection section detects notification information.

Another mode of the present invention is an information processing method carried out by a processor of a head-mounted display for blocking out an outside world from a user's vision when worn by the user to present a video. This method includes a step of measuring outside world information. This method includes another step of detecting whether or not the measured information contains any notification information to be notified to the user. This method includes still another step of notifying the user when notification information is detected.

Still another mode of the present invention is a program for causing a computer to perform the steps of the above method.

This program may be supplied as part of firmware built into an apparatus to basically control hardware resources such as video, audio, game apparatus, and head-mounted display. This firmware is stored in a semiconductor memory such as read only memory (ROM) or flash memory in the apparatus. In order to supply this firmware or to update part of the firmware, a computer-readable recording medium recording this program may be supplied or transmitted via a communication line.

It should be noted that arbitrary combinations of the above components and conversions of expressions of the present invention between method, device, system, computer program, data structure, recording medium and so on are also effective as modes of the present invention.

[Advantageous Effect of Invention]

The present invention provides a technology for notifying an outside world condition to a user wearing a non-see-through head-mounted display.

BRIEF DESCRIPTION OF DRAWINGS

FIG. 4 is a flowchart describing an information processing flow handled by the head-mounted display according to the embodiment.

DESCRIPTION OF EMBODIMENT

Figure 1:
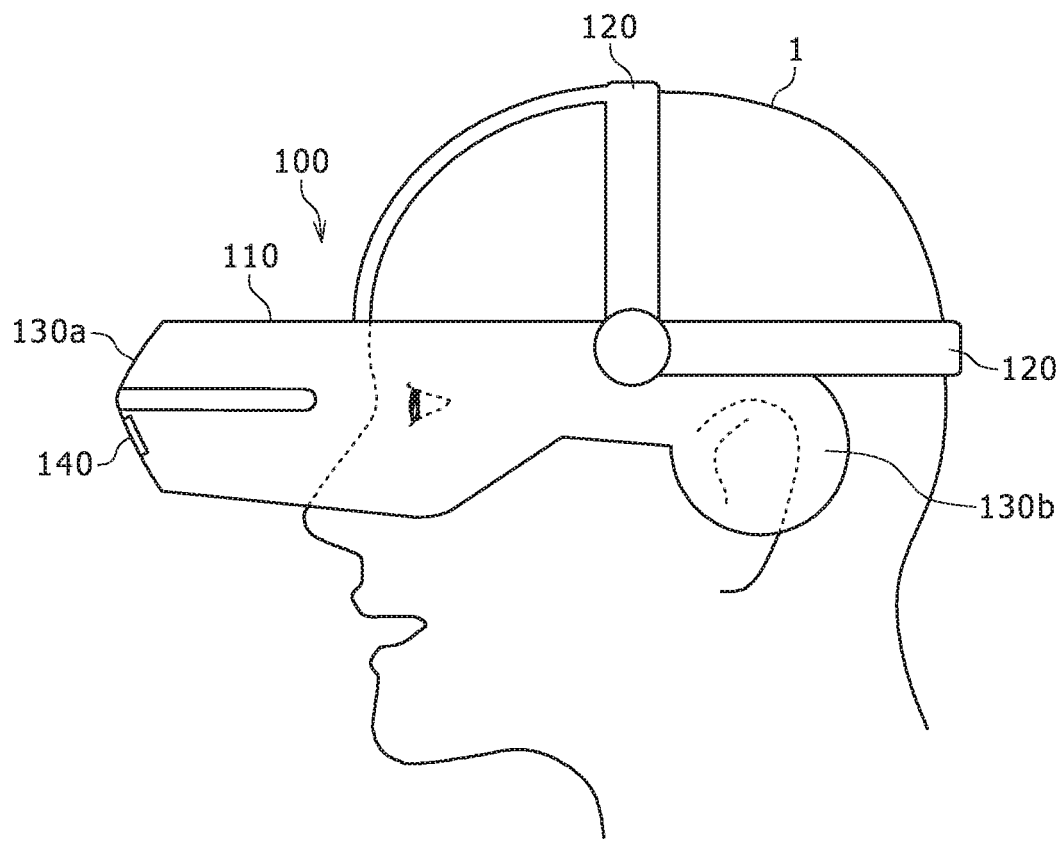
FIG. 1 is a diagram schematically illustrating an overview of an appearance configuration of a head-mounted display according to an embodiment.

FIG. 1 is a diagram schematically illustrating an overview of an appearance configuration of a head-mounted display 100 according to an embodiment, and shows that a user 1 is wearing the head-mounted display 100. It is assumed that the head-mounted display 100 according to the embodiment is a non-see-through head-mounted display. Therefore, when the user 1 wears the head-mounted display 100, the head-mounted display 100 blocks out an outside world from a vision of the user 1 as illustrated in FIG. 1. This allows the user 1 to focus on content videos presented by the head-mounted display 100, thus enhancing so-called "immersion."

The head-mounted display 100 includes a housing 110 and a fitting 120. The fitting 120 is a member used to fasten the housing 110 to a head of the user 1 and can be implemented, for example, by a tightening or elastic belt. The housing 110 accommodates a central processing unit (CPU) which is not shown, a movie presentation section 130a, and an audio presentation section 130b. The movie presentation section 130a includes, for example, a liquid crystal display (LCD) or organic electro-luminescence (EL). The audio presentation section 130b includes, for example, a speaker and an earphone. It should be noted that, in the present specification, a "video" includes a "movie," timely successive images, and "audio" that is played in synchronism with or independently of the movie. The head-mounted display 100 further includes an outside world measurement section 140 that measures information on an outside world of the housing 110. The outside world measurement section 140 will be described in detail later.

Figure 2:
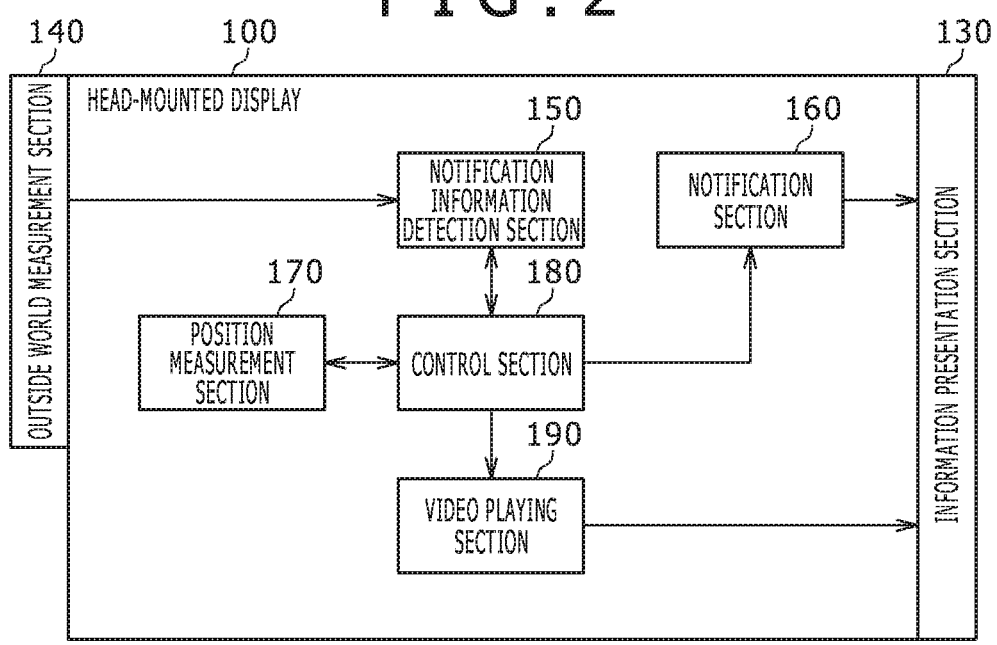
FIG. 2 is a diagram schematically illustrating a functional configuration of the head-mounted display according to the embodiment.

FIG. 2 is a diagram schematically illustrating a functional configuration of the head-mounted display 100 according to the embodiment. The head-mounted display 100 includes an information presentation section 130, the outside world measurement section 140, a notification information detection section 150, a notification section 160, a position measurement section 170, a control section 180, and a video playing section 190.

FIG. 2 illustrates a functional configuration for enabling the head-mounted display 100 according to the embodiment to notify an outside world condition to the user 1. Other part of the configuration is not shown. In FIG. 2, each of the elements described as a functional block for performing various processing tasks can be formed with a CPU, a main memory, and other large scale integrations (LSIs) in terms of hardware. In terms of software, on the other hand, each of the elements is implemented by a program loaded into the main memory. Therefore, it is understood by those skilled in the art that these functional blocks can be implemented in various ways by hardware alone, software alone, or a combination thereof and are not limited to any one of them.

The video playing section 190 plays the content video presented to the user 1. The video playing section 190 plays the content acquired via an unshown memory card slot or universal serial bus (USB) or by wireless means such as wireless fidelity (Wi-Fi) (registered trademark). The information presentation section 130 includes the movie presentation section 130a and the audio presentation section 130b described above, presenting the video played by the video playing section 190 to the user 1. The information presentation section 130 causes the movie presentation section 130a to present movies, still images, and other information and the audio presentation section 130b to present audio information. The information presentation section 130 functions as a user interface for presenting information generated by the head-mounted display 100 to the user 1.

The outside world measurement section 140 measures information on an outside world of the housing 110. The outside world measurement section 140 is provided at a position on the outside of the housing 110 of the head-mounted display 100 that matches the position in which the movie presentation section 130a is accommodated. Therefore, when the head-mounted display 100 is worn by the user 1, the outside world measurement section 140 can measure outside world information in the direction of line of sight of the user 1.

The outside world measurement section 140 can be implemented, for example, by a camera designed to measure visible radiation or an infrared camera designed to measure infrared radiation. It should be noted that the outside world measurement section 140 may be a stereo camera with at least two cameras. This makes it possible to acquire depth information of a subject by analyzing information measured by the outside world measurement section 140.

The notification information detection section 150 detects whether or not any notification information to be notified to the user 1 is contained in the information measured by the outside world measurement section 140. "Information to be notified" refers to information used to identify the extent to which the user 1 is allowed to move. More specifically, if the outside world measurement section 140 is a stereo camera, the notification information detection section 150 detects still objects that stand still of all subjects measured by the outside world measurement section 140, a stereo camera, as notification information. This can be implemented by a known 3D image analysis technology.

The notification section 160 notifies the user 1 when notification information is detected by the notification information detection section 150. For example, the notification section 160 may show, on the information presentation section 130, notification information to the effect that a still object exists in the outside world in the form of a message. Alternatively, a window showing a video of the still object may be displayed on the information presentation section 130. The notification section 160 may cause the information presentation section 130 to play notification information to the effect that a still object exists in the outside world in the form of audio information. Alternatively, the notification section 160 may cause the information presentation section 130 to play a warning tone indicating that a still object exists in the outside world. If the head-mounted display 100 has a vibrator (not shown), the user 1 may be notified by vibration.

The position measurement section 170 detects where the head-mounted display 100 exists. More specifically, the position measurement section 170 measures the position of the head-mounted display 100 in the space where the head-mounted display 100 exists. The position measurement section 170 includes, for example, an acceleration sensor and an angular speed sensor, thus detecting a relative position of the head-mounted display 100 with respect to a reference point determined in advance by the user 1.

The control section 180 comprehensively controls each of the different sections of the head-mounted display 100 described above. The control section 180 is implemented as a result of execution of the operating system of the head-mounted display 100 by the CPU (not shown) of the head-mounted display 100.

Figure 3:
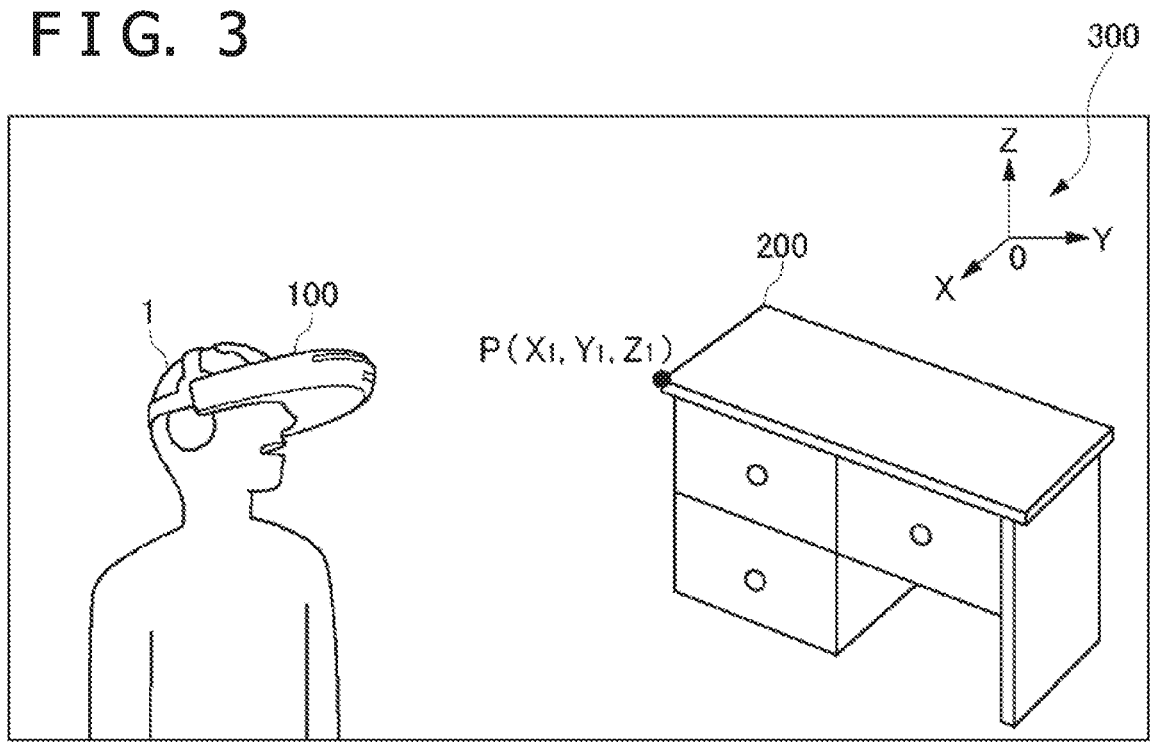
FIG. 3 is a diagram schematically illustrating a scene in which the head-mounted display according to the embodiment is used.

FIG. 3 is a diagram schematically illustrating a scene in which the head-mounted display 100 according to the embodiment is used. The example in FIG. 3 shows that the user 1 is wearing the head-mounted display 100 in a room where a desk 200 exists.

We consider, for example, a case in which the user 1 wears the head-mounted display 100 and plays a 3D game. In this case, the user 1 advances through the game by manipulating a controller of a gaming device (not shown). The head-mounted display 100 presents a video that changes in accordance with the progress of the game to the user 1.

As described above, the head-mounted display 100 according to the embodiment is a non-see-through head-mounted display that presents 3D videos full of immersion to the user 1. Therefore, what the user 1 perceives from the videos presented by the head-mounted display 100 is a realistic experience. In some cases, the user 1 may move his or her head or body reflexively. When the user uses the head-mounted display 100 in a relatively small space such as a room at home, the head-mounted display 100 can be made easier to use if the extent to which the user 1 is allowed to move, i.e., the area within which the user 1 can enjoy the game, can be presented. This can enhance the usability of the head-mounted display 100.

For this reason, when the notification information detection section 150 detects a still object, the notification to the user 1 by the notification section 160 may be triggered by the fact that the distance between the head-mounted display 100 and the still object becomes shorter than a given reference distance.

Here, the term "given reference distance" refers to a "notification reference distance" that serves as a reference for deciding whether or not the notification section 160 should notify notification information to the user 1. Although may be determined experimentally in consideration of the anticipated manner in which the head-mounted display 100 is used and so on, the notification reference distance is, for example, one meter. The notification section 160 notifies the user 1 accordingly if the distance between the still object and the head-mounted display 100 becomes shorter than one meter. This allows the user 1 to recognize that he or she has come close to the boundary of the movable area.

If the movement of the head-mounted display 100 is negligible, for example, as when the user 1 uses the head-mounted display 100 seated, the still object is shot as an immobile subject in the video shot by the outside world measurement section 140. In such a case, the notification information detection section 150 need only identify the still object by analyzing the video measured by the outside world measurement section 140. Further, if the outside world measurement section 140 is a stereo camera, the notification information detection section 150 can estimate the distance to the still object by analyzing the video measured by the outside world measurement section 140.

In contrast, if the user 1 uses the head-mounted display 100, for example, while standing and moving, the movement of the head-mounted display 100 is not negligible. In this case, analyzing the video measured by the outside world measurement section 140 alone may lead to low accuracy in identifying the still object. The reason for this is that the position of the still object, despite standing still object, changes in the video measured by the outside world measurement section 140 because of the movement of the head-mounted display 100.

Therefore, the notification section 160 may acquire the distance between the head-mounted display 100 and the still object based on the position of the head-mounted display 100 detected by the position measurement section 170. In this case, the user 1 determines a reference point for position measurement in advance before using the head-mounted display 100. In the example shown in FIG. 3, the user 1 determines a point P, a point in the desk 200, as the reference point P.

As illustrated in FIG. 3, the user 1 establishes a Cartesian coordinate system 300 with its origin set at an arbitrary point in the space where the user 1 and the desk 200 exist. The position of the reference point P can be set uniquely as position coordinates of the Cartesian coordinate system 300. In FIG. 3, the coordinates of the reference point P are set at $P(X_1, Y_1, Z_1)$. The user 1 moves the head-mounted display 100 to the position of the reference point P first and then instructs the head-mounted display 100 to start measurement. This can be accomplished, for example, by pressing a measurement start button (not shown) attached to the housing 110.

The position measurement section 170 includes an acceleration sensor and an angular speed sensor. The position measurement section 170 integrates output values of the sensors after being instructed to start measurement by the user 1, thus allowing for calculation of the relative position of the head-mounted display 100 with respect to the reference point P. Further, the position measurement section 170 can acquire the position coordinates of the head-mounted display 100 in the Cartesian coordinate system 300 by merging the relative position of the head-mounted display 100 with the coordinates $P(X_1, Y_1, Z_1)$ of the reference point P. In particular, if the user 1 specifies the reference point P as a point on the still object, the notification section 160 can calculate the distance between the still object and the head-mounted display 100 without using the coordinates $P(X_1, Y_1, Z_1)$ of the reference point P.

By acquiring the position coordinates of the head-mounted display 100, i.e., the movement of the head-mounted display 100, the notification information detection section 150 can identify the reason why the subject measured by the outside world measurement section 140 moved in the video. This provides improved accuracy in extraction of still objects by the notification information detection section 150. Further, the distance between the still object and the head-mounted display 100 can be acquired with higher accuracy than by acquiring depth information of the subject through analysis of information shot by the outside world measurement section 140, a stereo camera.

FIG. 4 is a flowchart describing an information processing flow handled by the head-mounted display 100 according to the embodiment. The processes in this flowchart begin, for example, when the head-mounted display 100 is powered on.

The outside world measurement section 140 measures outside world information in the direction of line of sight of the user 1 when the head-mounted display 100 is worn by the user 1 (S2). While a still object remains unfound by the notification information detection section 150 through analysis of the video measured by the outside world measurement section 140 (N in S4), the outside world measurement section 140 continues with measurement of the outside world.

When a still object is found in the video measured by the outside world measurement section 140 (Y in S4), the notification information detection section 150 sets the detected still object as notification information (S6). The notification section 160 acquires a distance L from the head-mounted display 100 to the still object (S8) based on the position of the head-mounted display 100 detected by the position measurement section 170.

When the distance L from the head-mounted display 100 to the still object is equal to or longer than a given reference distance $L_T$ (N in S10), the notification section 160 returns to step S8 to continue with acquisition of the distance L. If the distance L from the head-mounted display 100 to the still object is shorter than the given reference distance $L_T$ (Y in S10), the notification section 160 notifies the user via the information presentation section 130 that a still object is close (S12).

While the user 1 continues to use the head-mounted display 100 (N in S14), the head-mounted display 100 returns to step S2 to continue with the series of processes described above. When the user 1 stops using the head-mounted display 100 (Y in S14), the processes in this flowchart are terminated.

As described above, the head-mounted display 100 according to the embodiment can provide a technology for notifying an outside world condition to the user 1 wearing the non-see-through head-mounted display.

In particular, if the head-mounted display 100 worn by the user 1 comes close to a still object in the outside world, information to that effect is presented on the information presentation section 130 of the head-mounted display 100. This allows the user 1 to find out that he or she has come close to the boundary of the area within which the user 1 is allowed to freely move even with the non-see-through head-mounted display 100 on.

Thus, the present invention has been described based on the embodiment. It is to be understood by those skilled in the art that the embodiment is illustrative, that combinations of components and processes thereof can be modified in various ways, and that these modification examples also fall within the scope of the present invention.

In the above description, a case was described in which the notification information detection section 150 detected a still object in outside world information measured by the outside world measurement section 140 as notification information. Instead or in addition thereto, the notification information detection section 150 may detect, as notification information, an object moving at a given speed or more in outside world information measured by the outside world measurement section 140.

For example, if the user 1 uses the head-mounted display 100 according to the embodiment in a room with an inwardly opening door, the area within which the user 1 is allowed to freely move changes when the door is opened by somebody other than the user 1. That is, if the inwardly opening door opens, this means that the door enters into the room, thus resulting in a smaller area within which the user 1 is allowed to move. For this reason, the unshown notification information detection section 150 detects a moving object in the outside world information measured by the outside world measurement section 140, notifying the result thereof to the user 1.

This allows the head-mounted display 100 according to a modification example to notify any change in the outside world condition to the user 1 wearing the non-see-through head-mounted display. Even in the event of a change in the area within which the user 1 is allowed to move, the head-mounted display 100 can adaptively notify the boundary thereof to the user 1.

REFERENCE SIGNS LIST

100 Head-mounted display, 110 Housing, 120 Fitting, 130 Information presentation section, 130a Movie presentation section, 130b Audio presentation section, 140 Outside world measurement section, 150 Notification information detection section, 160 Notification section, 170 Position measurement section, 180 Control section, 190 Video playing section, 200 Desk, 300 Cartesian coordinate system.

INDUSTRIAL APPLICABILITY

The present invention is applicable to information processing technologies for head-mounted displays.

The invention claimed is:

1. A head-mounted display for blocking out an outside world from a user's vision when worn by the user to present a video, the head-mounted display comprising:
   an outside world measurement section adapted to measure outside world information;
   a notification information detection section adapted to detect whether or not the information measured by the outside world measurement section contains any notification information to be notified to the user, including that the notification information detection section detects at least one reference position, which is set by the user as notification information; and
   a notification section adapted to notify the user when the notification information detection section detects notification information by way of displaying a video of the at least one reference position to the user in the head-mounted display.

2. The head mounted display of claim 1, wherein the at least one reference position is detected by the system using an object moved by the user.

3. The head mounted display of claim 1, wherein the at least one reference position is detected by the system using an object worn by the user.

4. The head mounted display of claim 3, wherein the object worn by the user is the head mounted display.

5. The head mounted display of claim 1, wherein the at least one reference position is detected by the system using an object moved by the user, which is the head mounted display.

6. The head mounted display of claim 1, wherein the at least one reference position is detected by the system using a user-controlled object, whereby the user presses a button on the user-controlled object.

7. The head mounted display of claim 1, wherein the user sets the at least one reference position in advance of using the head-mounted display.

8. The head mounted display of claim 1, wherein the notification is triggered when a distance between the head-mounted display and the at least one reference position becomes shorter than a reference distance.

9. The head mounted display of claim 1, wherein the outside world measurement section is attached to the head-mounted display.

10. A method of blocking out an outside world from a user's vision, comprising:
    providing a head-mounted display to be worn by the user and presenting a video to the user through the head-mounted display;
    measuring outside world information via an outside world measurement section of the head mounted display;
    detecting, via a notification information detection section, whether or not the information measured by the outside world measurement section contains any notification information to be notified to the user, including that the notification information detection section detects at least one reference position, which is set by the user as notification information; and
    notifying the user, via a notification section, when the notification information detection section detects notification information by way of displaying a video of the at least one reference position to the user in the head-mounted display.

11. The method of claim 10, wherein the at least one reference position is detected by the system using an object moved by the user.

12. The method of claim 10, wherein the object moved by the user is worn by the user.

13. The method of claim 12, wherein the object worn by the user is the head mounted display.

14. The method of claim 10, wherein the object moved by the user is the head mounted display.

15. The method of claim 10, wherein the at least one reference position is detected by the system using a user-controlled object, whereby the user presses a button on the user-controlled object.

16. The method of claim 10, wherein the user sets the at least one reference position in advance of using the head-mounted display.

17. The method of claim 10, wherein the notification is triggered when a distance between the head-mounted display and the at least one reference position becomes shorter than a reference distance.

18. The method of claim 10, wherein the outside world measurement section is attached to the head-mounted display.

19. A non-transitory, computer readable storage medium containing a computer program, which when executed by a computer, operates to carry out a method of blocking out an outside world from a user's vision, the method comprising:
- providing a head-mounted display to be worn by the user and presenting a video to the user through the head-mounted display;
- measuring outside world information via an outside world measurement section of the head mounted display;
- detecting, via a notification information detection section, whether or not the information measured by the outside world measurement section contains any notification information to be notified to the user, including that the notification information detection section detects at least one reference position, which is set by the user as notification information; and
- notifying the user, via a notification section, when the notification information detection section detects notification information by way of displaying a video of the at least one reference position to the user in the head-mounted display.

\* \* \* \* \*